United States Patent [19]
Wen

[11] Patent Number: 5,992,973
[45] Date of Patent: Nov. 30, 1999

[54] INK JET PRINTING REGISTERED COLOR IMAGES

[75] Inventor: Xin Wen, Rochester, N.Y.

[73] Assignee: Eastman Kodak Company, Rochester, N.Y.

[21] Appl. No.: 09/175,488

[22] Filed: Oct. 20, 1998

[51] Int. Cl.$^6$ .............................. B41J 2/21; B41J 29/393
[52] U.S. Cl. ............................................... 347/43; 347/19
[58] Field of Search ............................... 347/43, 40, 19, 347/20, 37, 105, 106; 395/111

[56] References Cited

U.S. PATENT DOCUMENTS

| | | | |
|---|---|---|---|
| 3,946,398 | 3/1976 | Kyser et al. | 347/70 |
| 4,490,728 | 12/1984 | Vaught et al. | 347/60 |
| 4,878,063 | 10/1989 | Katerberg | 347/43 |
| 5,057,854 | 10/1991 | Pond et al. | 347/42 |
| 5,141,599 | 8/1992 | Jahn et al. | 162/137 |
| 5,469,199 | 11/1995 | Allen et al. | 347/42 |
| 5,479,199 | 12/1995 | Moore et al. | 347/102 |
| 5,508,783 | 4/1996 | Iwagaki et al. | 355/40 |
| 5,568,172 | 10/1996 | Cowger | 347/19 |
| 5,608,639 | 3/1997 | Twardowski et al. | 364/469.04 |
| 5,767,874 | 6/1998 | Wen et al. | 347/40 |
| 5,793,392 | 8/1998 | Tschida | 347/40 |

FOREIGN PATENT DOCUMENTS 761 449 A2  8/1996  European Pat. Off. .

Primary Examiner—N. Le
Assistant Examiner—Thinh Nguyen
Attorney, Agent, or Firm—Raymond L. Owens

[57] ABSTRACT

Ink jet printing apparatus for forming a color ink image on a receiver in response to a digital image that includes a plurality of color planes, includes a plurality of color ink jet print head located at spaced apart transfer positions adapted to deliver color ink to the receiver to form a color ink image at an image receiving position, and the spacing between color ink jet print heads being selected to be a distance longer than the length of a color ink image to be formed on the receiver. The receiver is moved along a path past the color ink jet print heads, a registration mark formed on the receiver before the image receiving position. Two detectors are disposed adjacent to the path with each detector being disposed before a color ink jet print head for detecting the registration mark before printing the corresponding color plane of the ink image to produce a signal a control circuit is responsive to the digital image and the detector signals for actuating each color ink jet print head to form the corresponding color plane of the ink image on the receiver in registration with the previously printed color planes of the same ink image.

9 Claims, 2 Drawing Sheets

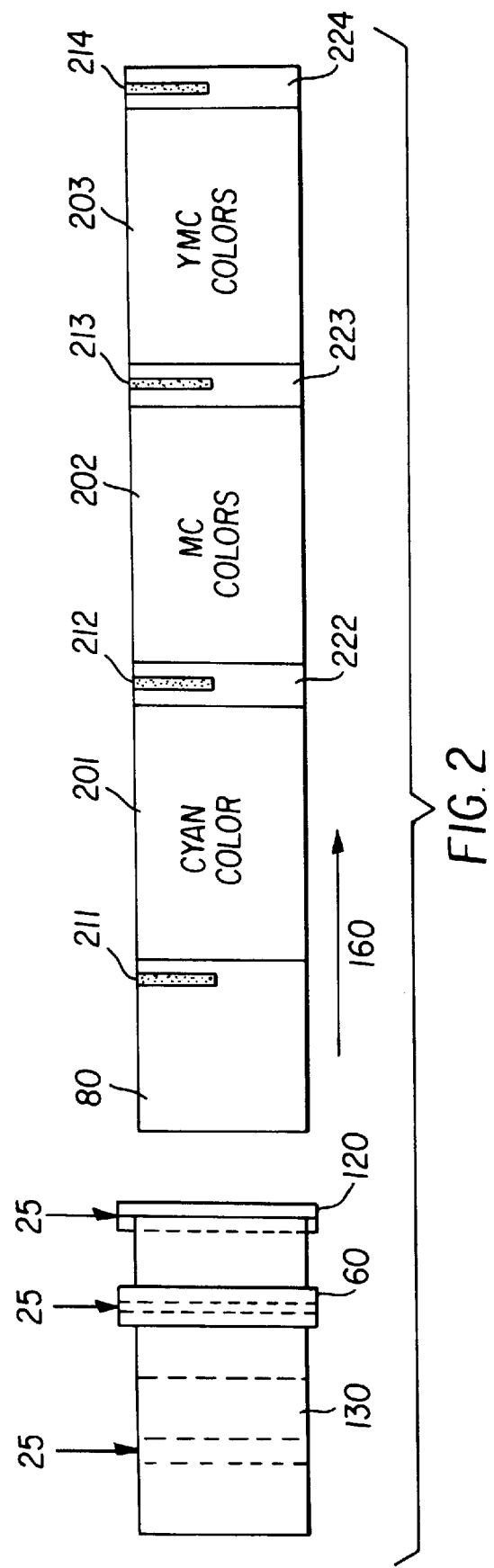

INK JET PRINTING REGISTERED COLOR IMAGES

CROSS REFERENCE TO RELATED APPLICATIONS

Reference is made to commonly assigned U.S. patent application Ser. No. 09/118,538, filed Jul. 17, 1998, entitled "Borderless Ink Jet Printing on Receivers", commonly assigned U.S. patent application Ser. No. 09/133,879, filed Aug. 14, 1998, entitled "Compensating For Receiver Skew in Ink Jet Printer", and commonly assigned U.S. patent application Ser. No. 09/164,247 filed Sep. 30, 1998, entitled "Ink Jet Printing of Color Image and Annotations". The disclosure of these related applications is incorporated herein by reference.

FIELD OF THE INVENTION

The present invention relates to providing registered color ink images on receivers.

BACKGROUND OF THE INVENTION

Ink jet printing has become a prominent contender in the digital output arena because of its non-impact, low-noise characteristics, its compatibility with plain paper and its avoidance of toner transfers and fixing as well as lack of pressure contact at printing interface. Ink jet printing mechanisms includes continuous ink jet or drop-on-demand ink jet. U.S. Pat. No. 3,946,398, which issued to Kyser et al. in 1970, discloses a drop-on-demand ink jet printer which applies a high voltage to a piezoelectric crystal, causing the crystal to bend, applying pressure on an ink reservoir and jetting drops on demand. Other types of piezoelectric drop-on-demand printers utilize piezoelectric crystals in push mode, shear mode, and squeeze mode. Piezoelectric drop-on-demand printers have achieved image resolutions up to 720 to 1440 dpi for home and office printers.

Great Britain Patent 2,007,162, which issued to Endo et al. in 1979, discloses an electrothermal drop-on-demand ink jet printer which applies a power pulse to an electrothermal heater which is in thermal contact with water based ink in a nozzle. A small quantity of ink rapidly evaporates, forming a bubble which causes an ink drop to be ejected from small apertures along the edge of the heater substrate. This technology is known as Bubblejet™ (trademark of Canon K. K. of Japan).

U.S. Pat. No. 4,490,728, which issued to Vaught et al. in 1982, discloses an electrothermal drop ejection system which also operates by bubble formation to eject drops in a direction normal to the plane of the heater substrate. As used herein, the term "thermal ink jet" is used to refer to both this system and system commonly known as Bubblejet™.

The advancement of ink jet printing technologies has opened up opportunities for applications in photo minilab and microlab. In these environments, the ink jet printing techniques have the advantages of easy image manipulation, compatibility with digital image files, and faster turn-around time. When configured properly, ink jet printers can deliver images with qualities comparable to that of the traditional photographs. For digital photo applications, it is crucial to minimize all image artifacts related ink jet printing so that the customers can perceive the digital prints having the similar image quality as the traditional photographs.

Many image artifacts in ink jet printing are caused by improper (i.e. not rapid enough) drying of ink dots on the ink receivers. The ink dots are formed by ink droplets ejected from the ink jet print heads. The drying of ink dots on the receiver can include several stages. First, within each printing pass (or swath), the ink dots freshly placed on the receiver need to dry fast enough so that the ink dots will not merge with each other. The interaction (e.g. merging) of ink dots on the receiver can cause image artifacts such as coalescence and inter color bleeding. For a print head transport speed of 20 inch/second relative to a 20 inch wide receiver, for example, the time scale of this drying stage is in the range of 10 $\mu$s to 1 second. Second, after an ink image is printed, the ink receiver needs to be dry on the surface before it can be stacked with other printed images or handled by a customer. This time scale is typically in the range of 10 seconds to 10 minutes, depending on the printing throughput and the size of the ink image.

The drying mechanisms of ink dots on receiver include absorption by the ink receiver and the evaporation to the ambient environment. The ink drying can be accelerated by improving both mechanisms. Absorbant materials are often coated in the ink receiver to accelerate absorption of ink solution into the receiver. Auxiliary drying devices can also be installed in the ink jet printer to assist evaporation of ink into air. Many techniques have been reported in these areas. Examples of the disclosures can be found in U.S. Pat. Nos. 5,141,599, 5,479,199 and EP 761 449 A2. These techniques, however, have the disadvantages in added cost. Furthermore, photo color images usually have high ink coverage; the above techniques often do not dry ink fast enough to eliminate coalescence and color bleeding artifacts.

Artifacts in color ink images also include misregistration between different color planes of a color ink image. For example, if cyan, magenta, and yellow colors are to be sequentially formed on a receiver, if the yellow image plane is printed not in registration with the cyan and magenta color planes, improper colors will result in the formed color ink image.

SUMMARY OF THE INVENTION

An object of the present invention is to provide high-quality color ink images on receiver with reduced image artifacts caused by improper drying and misregistration.

This objects is achieved by ink jet printing apparatus for forming a color ink image on a receiver in response to a digital image that includes a plurality of color planes, comprising:

a) a plurality of color ink jet print head located at spaced apart transfer positions adapted to deliver color ink to the receiver to form a color ink image at an image receiving position, and the spacing between color ink jet print heads being selected to be longer than the length of a color ink image to be formed on the receiver;

b) means for moving the receiver along a path past the color ink jet print heads, a registration mark formed on the receiver before the image receiving position;

c) at least two detectors disposed adjacent to the path with each detector being disposed before a color ink jet print head for detecting the registration mark before printing the corresponding color plane of the ink image to produce a signal; and d) control means responsive to the digital image and the detector signals for actuating each color ink jet print head to form the corresponding color plane of the ink image on the receiver in registration with the previously printed color planes of the same ink image

ADVANTAGES

A feature of this invention is that a time delay is provided between the printing of different color planes of a color ink image, thereby permitting proper drying of the different colors of an ink image.

Another advantage of this invention is that the time delay between the printing of different color planes of a color image improves the ink drying on the receiver while maintaining the printing productivity in a continuous printing mode.

Another feature of this invention is that registration between color planes of a color image can be assured by a registration mark provided before the image receiving position and the detection of the registration mark before printing the subsequent color planes. The registration mark can also provide a code to carry information about the color ink image behind it.

BRIEF DESCRIPTION OF THE DRAWINGS

FIG. 2 is a partial top view of the ink jet printing apparatus of FIG. 1 showing the printing sequence of the different color planes of the color images.

DETAILED DESCRIPTION OF THE INVENTION

Figure 1:
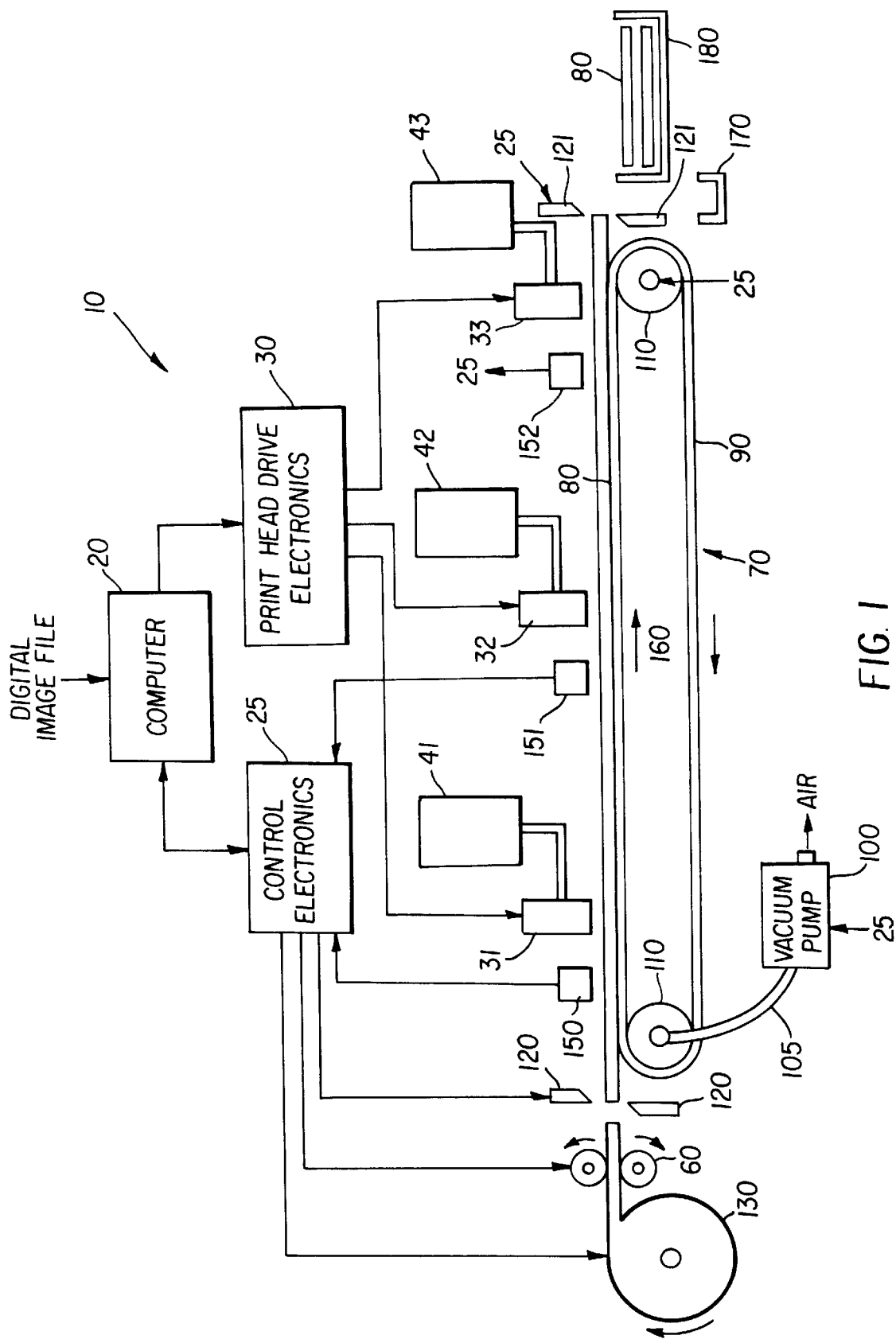
FIG. 1 is a schematic view of an ink jet printing apparatus in accordance with the present invention.

The present invention is described with relation to an ink jet printing apparatus printing apparatus that provides ink image with reduced image artifacts on a ink receiver.

Referring to FIG. 1, an ink jet printing apparatus 10 comprises a computer 20, control electronics 25, print head drive electronics 30, cyan ink jet print head 31, magenta ink jet print head 32, and yellow ink jet print head 33. The ink jet print heads 31–33 are spaced apart by distances more than the typical length of one digital image. The computer 20 receives a digital image file. The computer 20 controls the print head drive electronics 30 to cause the ink jet print heads 31–33 to print color images on a receiver 80. The ink jet printing apparatus 10 also includes cyan ink reservoir 41, magenta ink reservoir 42, and yellow ink reservoir 43 for providing the cyan, magenta and yellow inks to the ink jet print heads 31–33 respectively. Although not shown, the ink jet printing apparatus 10 can also include print heads and ink reservoirs for printing and storing other color inks such as black, green, red, orange, gold, as well as inks of the same color but of different concentrations such as light cyan and light magenta inks.

The ink jet printing apparatus 10 further includes a receiver feed mechanism 60 that has a pair of capstan rollers, for feeding the receiver 80, in the form of a web, from a receiver roll 130. A receiver transport mechanism 70 moves the receiver 80 over a platen belt 90 along the receiver transport path 160 to an image receiving position under the print heads 31–33. The platen belt 90 is translated by platen transport rollers 110. The platen transport rollers 110 and thus the receiver transport mechanism 70 are controlled by control electronics 25. The receiver 80 is held to the platen belt 90 by vacuum suction provided by a vacuum pump 100 via a vacuum tube 105. The vacuum pump 100 is under the control of the control electronics 25. No mechanical components are used to hold the receiver 80 to the platen belt 90 on the ink receiving side of the receiver 80. This permits the ink jet print heads 31–33 to print freely across the whole receiver 80 from edge to edge to provide borderless ink prints, as discussed below. The platen belt 90 in FIG. 1 is shown in the form of an extended conveyance belt. To reduce the foot stand of the ink jet printer, the platen belt can be folded so that ink jet print heads 31–33 can be placed over different flat areas of the platen belt 90.

The ink jet print heads 31–33 each include a plurality of ink nozzles and associated ink drop activators for delivering different color ink drops to the receiver 80. Preferably, the length of ink jet print head 31 is across the full width of the receiver 80. The ink jet print heads 31–33 can be ink jet print bar that span substantially across the receiver 80, or narrow print heads that print across the receiver 80 in a swath fashion. The ink drop ejection can be actuated from the ink nozzles by the ink jet activation means well known in the art, for example, piezoelectric actuators or thermal electric actuators. Examples of ink jet print bars are shown in commonly assigned U.S. Pat. Nos. 5,469,199; 5,057,854; and 5,767,874 the disclosure of which is incorporated herein by reference. The alignment of an ink jet print bar is disclosure in the above referenced commonly assigned U.S. patent application Ser. No. 09/133,879, filed Aug. 14, 1998, entitled "Compensating For Receiver Skew in Ink Jet Printer".

Borderless print is a very desirable feature to photographic viewers. Borderless print refers to photographic images that are printed from edge to edge on a receiver. Borderless prints can be provided by the ink jet printing apparatus 10 shown in FIG. 1 using the teachings previously disclosed by the present inventor in the above referenced commonly assigned U.S. patent application Ser. No. 09/118, 538, filed Jul. 17, 1998, entitled "Borderless Ink Jet Printing on Receivers". Annotations can also be printed by the ink jet printing apparatus 10 shown in FIG. 1 using the techniques previously disclosed by the present inventor in the above referenced commonly assigned U.S. patent application Ser. No. 09/164,247 filed Sep. 30, 1998, entitled "Ink Jet Printing of Color Image and Annotations".

The digital image file sent to the computer 20 can include a plurality of digital images. Each digital image can include several color planes such as yellow, magenta, cyan, and black. The digital images can include definition of the image format for each digital image, including the formats well known in the art such as 3"×5" (3R), 4"×6" (4R), high definition TV (HDTV), or panorama. The digital image file can also include information such as the time, the location, the scene, exposure conditions, annotations etc. related to each digital image. A printing job is typically formed by a group of digital images, for example, digital images requested by on customer or from a group of related scenes captured. The ink jet printing apparatus 10 can also divide digital images based on the length of the platen belt 90, or convenience for handling the printed images.

FIG. 2 is a partial top view of the ink jet printing apparatus of FIG. 1 showing the printing sequence of the different color planes of the color images. The receiver 80 has a plurality of printed ink images 201, 202, 203. The ink images 201–203 are printed without borders from the side-edge to the side-edge of the receiver 80. Although not required, the ink images 201, 202, 203 are separated by unprinted areas 222, 223, 224. For clarity, the ink jet print heads 31–33 and the receiver detectors 150–152 are shown in FIG. 2. The receiver detector 150 detects the lead edge of the receiver 80 and provides a lead edge signal to the control electronics 25. The detectors 151 and 152 detect the registration mark and provide registration signals to the control electronics 25. One feature of the different color ink jet print heads 31–33 are separated by more the typical length of a digital image. FIG. 2 illustrates the status of the ink images 201–203 on the receiver 80 during the printing process as the receiver 80 is moved along the receiver transport path 160. At this moment, the cyan ink jet print head 31 just finished printing the cyan plane of the ink image 201. The magenta ink jet 32 just finished printing the magenta plane of a different ink image 202. Similarly, the yellow ink jet print head 33 just finished printing the yellow color plane of the ink image 203. As a result, a color image containing yellow, magenta, cyan colors (YMC) has been printed for ink image 203. Only magenta and cyan colors (MC) have been printed for ink image 202. Only cyan color (C) has been printed for the ink image 201.

The delay time between the printing of different color planes in one ink image permits the cyan ink on the receiver 80 to be dried before the magenta or the yellow ink are placed on the receiver 80. This greatly reduces the ink dots on the receiver 80 to coalesce or bleed between colors. The extra times for drying also improve the drying of the full color (YMCK) ink images so that after the images are cut, they can be stacked in the receiver tray 180. It should be noted that for a printing job that includes many digital images, the different color ink jet print heads 31–33 are operated simultaneously even if they print different ink images. In other words, the printing throughput in a continuous mode is maintained.

The ink images 201–203 are separated by unprinted areas 222–224 along the web of the receiver 80. Before the cyan ink jet print head 31 prints the cyan color plane for each image, it prints cyan registration marks 212–214 between the ink images 201–203. The registration marks 212–214 can also be printed within the unprinted areas areas 222–224 between the ink images 201–203 or on the borders along the side edges of the ink images 201–203. As the receiver 80 is transported before the ink jet print heads 32, 33, the registration marks 212–214 are detected by receiver detectors 151 and 152 so that the magenta and yellow color planes can be respectively printed by the ink jet print heads 32, 33 in perfect registration relative to the cyan color plane. Receiver detector 150 detects the lead edge of the receiver 80 for each printing job so that the computer 20 can determine the location of the first ink image relative to the receiver edge within that printing job.

The registration marks 211–214 can be printed as a solid bar in maximum density in a color (such as cyan in FIG. 2). Alternatively, the registration marks can be printed in a coded pattern that carries information related to the following ink image. For example, a bar code pattern can be printed to represent the format of the following ink image so that that image can be cut to the correct length by the second cutter 121. This bar code pattern is detected by one of the receiver detectors 151 or 152, but preferably receiver detector 152. The computer 20, in response to the coded information, determines the size of the receiver sheet and causes the control electronics 25 to operate the receiver cutters 120 and 121. Furthermore, the registration marks can also be preprinted on the receiver 80 when it is wound in the receiver roll 130.

The operations of the receiver detectors 150–152 are now described. Referring to both FIGS. 1 and 2, the ink jet printing apparatus 10 includes receiver detectors 15–152 in bi-directional communication with the control electronics 25. Each of the receiver detectors 150–152 can include a photodiode or an image sensor (not shown) for detecting the position of the registration marks 21–214 (as described below in relation to FIG. 2). The image sensor is preferably an area image sensor such as a CMOS or a CCD imager. The receiver detectors 15–152 can also include a light source such a light emitting diode, a diode laser, or a fluorescent lamp. The receiver detectors 15–152 receive commands from control electronics 25 for detecting positions of the registration marks 211–214 and the lead edge of the receiver 80. A color filter can be used to enhance the contrast or the signal-to-noise ratio of the registration mark in specific color, for example, a red filter for a cyan registration mark. The reflection density changes are detected by a photodiode or an image sensor. The receiver detectors 150–152 send image signals to the control electronics 25 which in turn sends the image signals to the computer 20. The receiver detector 150 provides the lead edge signal to the control electronics 25 which digitizes and transfers it to the computer 20. In similar fashion, the digitized registration signals provide by the receiver detectors 151 and 152 are also delivered to the computer 20. The computer 20 responds to the lead edge and registration signals and processes the signal data and determines the correct position for forming color image planes on the receiver. It provides controls signals to the control electronics 25 at the appropriate time to actuate the print heads 31, 32, and 33, respectively. The locations of the registration marks 212–214 are used by computer 20 for calculating the start time of the next color plane. For example, the yellow plane of the ink image 203 is printed by the yellow ink jet print head 33 in reference to the detected location of registration mark 214.

Referring now to both FIGS. 1 and 2, the ink jet printing apparatus 10 also includes a first receiver cutter 120 and a second receiver cutter 121. The cutting operations of the two receiver cutters 120, 121 are controlled by control electronics 25. The first receiver cutter 120 cuts the receiver 80 to appropriate length for a printing job. The individual ink images 201, 202, 203 are cut by the second receiver cutter 121 and ejected to the receiver tray 180. More particularly, the control electronics 25 in response to the detection of the registration signals determines the length of the receiver to be cut and accordingly operates both the receiver 121. The size of the receiver to be cut can, as discussed above, be decoded from the registration marks. The regions between ink images 201–203 (such as unprinted areas 222–224) are cut as slugs by the second receiver cutter 121 to be dropped to the slug container 170. As borderless images usually enhance the photographic look and feel, the second receiver cutter 121 can cut off borders of the ink images 201–203 along the receiver transport path 160 so that borderless ink images can be provided by the ink jet printing apparatus 10.

It should be noted that a printing job in the present invention can also be a single digital image. In this case, the receiver can be cut to the final image length by the first receiver cuter 120. The receiver detectors 150, 152, 153 each detect the lead edge of the cut-sheet receiver before the respective printing of each of the color planes by the ink jet print heads 31, 32, 33.

The invention has been described in detail with particular reference to certain preferred embodiments thereof, but it will be understood that variations and modifications can be effected within the spirit and scope of the invention.

| PARTS LIST | |
|---|---|
| 10 | ink jet printing apparatus |
| 20 | computer |
| 25 | control electronics |
| 30 | print head drive electronics |

-continued

PARTS LIST

| | |
|---|---|
| 31 | cyan ink jet print head |
| 32 | magenta ink jet print head |
| 33 | yellow ink jet print head |
| 41 | cyan ink reservoir |
| 42 | magenta ink reservoir |
| 43 | yellow ink reservoir |
| 60 | receiver feed mechanism |
| 70 | receiver transport mechanism |
| 80 | ink receiver |
| 90 | platen belt |
| 100 | vacuum pump |
| 105 | vacuum tube |
| 110 | platen transport roller |
| 120 | first receiver cutter |
| 121 | second receiver cutter |
| 130 | receiver roll |
| 150 | receiver detector |
| 151 | receiver detector |
| 152 | receiver detector |
| 160 | receiver transport path |
| 170 | slug container |
| 180 | receiver tray |
| 201 | ink image |
| 202 | ink image |
| 203 | ink image |
| 211 | registration mark |
| 212 | registration mark |
| 214 | registration mark |
| 222 | unprinted area |
| 223 | unprinted area |
| 224 | unprinted area |

What is claimed is:

1. Ink jet printing apparatus for forming a color ink image on a receiver in response to a digital image that includes a plurality of color planes, comprising:
   a) a plurality of color ink jet print heads located at spaced apart transfer positions adapted to deliver color ink to the receiver to form a color ink image at an image receiving position, and the spacing between the color ink jet print heads being selected to be longer than the color ink image to be formed on the receiver;
   b) means for moving the receiver along a path past the color ink jet print heads, the first ink jet print head forming a registration mark on the receiver before a color plane of the image is formed;
   c) at least two detectors disposed adjacent to the path with each detector being disposed before color inkjet print heads for detecting the registration mark to produce a registration signal before printing the corresponding color plane of the ink image; and
   d) control means responsive to the digital image and the registration signals for actuating each color ink jet print head to form the corresponding color plane of the ink image on the receiver in registration with the previously printed color planes of the same ink image.

2. The ink jet printing apparatus of claim 1 wherein the registration mark is coded to carry information as to a desired size of the image to be formed.

3. The ink jet printing apparatus of claim 1 wherein the receiver is in the form of a web and further including cutting means disposed after the last of the plurality of color ink jet print heads for cutting the receiver to a desired size in response to the control means.

4. The ink jet printing apparatus of claim 2 wherein the receiver is in the form of a web and further including cutting means disposed after the last color ink jet print head for cutting the receiver and the control means in response to the registration mark for causing the cutting means to cut the receiver to a desired size.

5. Ink jet printing apparatus for forming a color ink image in reference to a registration mark on a receiver in response to a digital image that includes a plurality of color planes, comprising:
   a) means for forming a registration mark on the receiver before a color plane of the image is formed;
   b) at least three color ink jet print heads located at spaced apart transfer positions adapted to deliver color ink to the receiver to form a color ink image at the image receiving position, and the spacing between color ink jet print heads being selected to be longer than the color ink image to be formed on the receiver;
   c) means for moving the receiver along a path past the color ink jet print heads;
   d) at least three detectors disposed adjacent to the path with at least two detectors being disposed before color ink jet print heads for detecting the registration mark to produce a registration signal before printing the corresponding color plane of the ink image and one detector being disposed before the first color ink jet print head to detect the lead edge of the receiver and produce a lead edge signal; and
   e) control means responsive to the digital image, the registration signals and the lead edge signal for actuating each color ink jet print head to form the corresponding color plane of the ink image on the receiver so that the printed color planes of the same ink image are in registration.

6. The ink jet printing apparatus of claim 5 wherein at least one of color ink jet print heads forms the registration mark.

7. The ink jet printing apparatus of claim 5 wherein the registration mark is coded to carry information as to a desired size of the image to be formed.

8. The ink jet printing apparatus of claim 5 wherein the receiver is in the form of a web and further including cutting means disposed after the last of the plurality of color ink jet print heads for cutting the receiver to a desired size in response to the control means.

9. The inkjet printing apparatus of claim 7 wherein the receiver is in the form of a web and further including cutting means disposed after the last color ink jet print head for cutting the receiver and the control means in response to the registration mark for causing the cutting means to cut the receiver to a desired size.

* * * * *